United States Patent
Xu et al.

(10) Patent No.: US 11,831,566 B2
(45) Date of Patent: Nov. 28, 2023

(54) METHOD AND APPARATUS FOR TRANSMITTING SCENE IMAGE OF VIRTUAL SCENE, COMPUTER DEVICE, AND COMPUTER-READABLE STORAGE MEDIUM

(71) Applicant: Tencent Technology (Shenzhen) Company Limited, Shenzhen (CN)

(72) Inventors: Minhua Xu, Shenzhen (CN); Dawei Sun, Shenzhen (CN); Liang Fang, Shenzhen (CN); Tao Ren, Shenzhen (CN); Chuanqi Kan, Shenzhen (CN)

(73) Assignee: Tencent Technology (Shenzhen) Company Limited, Guangdong (CN)

( * ) Notice: Subject to any disclaimer, the term of this patent is extended or adjusted under 35 U.S.C. 154(b) by 739 days.

(21) Appl. No.: 16/991,891

(22) Filed: Aug. 12, 2020

(65) Prior Publication Data

US 2020/0374242 A1    Nov. 26, 2020

Related U.S. Application Data

(63) Continuation of application No. PCT/CN2019/082724, filed on Apr. 15, 2019.

(30) Foreign Application Priority Data

Jun. 15, 2018 (CN) .......................... 201810621056.7

(51) Int. Cl.
*G06T 9/00* (2006.01)
*H04L 49/90* (2022.01)
(Continued)

(52) U.S. Cl.
CPC ............... *H04L 49/90* (2013.01); *G06F 3/14* (2013.01); *G06T 9/00* (2013.01); *G06T 11/00* (2013.01); *G06T 2200/16* (2013.01)

(58) Field of Classification Search
CPC ... H04L 49/90; G06F 3/14; G06T 9/00; G06T 11/00; G06T 2200/16; G06T 15/005;
(Continued)

(56) References Cited

U.S. PATENT DOCUMENTS

| 2014/0099040 A1 | 4/2014 | Maegawa et al. |
| 2014/0327698 A1 | 11/2014 | Schoenefeld et al. |

(Continued)

FOREIGN PATENT DOCUMENTS

| CN | 102143360 A | 8/2011 |
| CN | 103077015 A | 5/2013 |

(Continued)

OTHER PUBLICATIONS

Extended European Search Report for European Patent Application No. 19819038.1 dated Apr. 1, 2021; 8 pages.
(Continued)

*Primary Examiner* — Huy C Ho
(74) *Attorney, Agent, or Firm* — Crowell & Moring LLP

(57) ABSTRACT

This application relates to a method for transmitting a scene image of a virtual scene. The method includes: rendering a first image to obtain a first rendered image, wherein the first image is obtained through acquisition of display data of a virtual scene when the display data changes; acquiring a first time point at which the rendering of the first image is completed; encoding the first rendered image to obtain an encoded image when an interval between the first time point and a second time point is not less than a first interval threshold, wherein the second time point is a time point at which image encoding is performed last time; and transmitting the encoded image to a terminal for decoding and displaying.

20 Claims, 9 Drawing Sheets

(51) Int. Cl.
*G06F 3/14* (2006.01)
*G06T 11/00* (2006.01)

(58) Field of Classification Search
CPC ......... H04N 21/2187; H04N 21/23418; H04N 21/2343; H04N 21/816; H04N 19/164; H04N 19/70
USPC ....................................................... 382/130
See application file for complete search history.

(56) References Cited

U.S. PATENT DOCUMENTS

| | | | |
|---|---|---|---|
| 2015/0103894 A1 | 4/2015 | Diard | |
| 2017/0178408 A1* | 6/2017 | Bavor, Jr. | ............. G06T 19/006 |
| 2017/0249920 A1 | 8/2017 | Cook et al. | |
| 2018/0063602 A1 | 3/2018 | Kalish et al. | |

FOREIGN PATENT DOCUMENTS

| | | |
|---|---|---|
| CN | 103716596 A | 4/2014 |
| CN | 105118077 A | 12/2015 |
| CN | 107370714 A | 11/2017 |
| CN | 107660280 A | 2/2018 |
| CN | 107979763 A | 5/2018 |
| CN | 108810554 A | 11/2018 |
| JP | 2002-084339 A | 3/2002 |
| JP | 2004-172830 A | 6/2004 |
| JP | 2008-543176 A | 11/2008 |
| JP | 2011-119971 A | 6/2011 |
| JP | 5418350 B2 | 2/2014 |
| JP | 2014-075735 A | 4/2014 |

OTHER PUBLICATIONS

International Search Report and Written Opinion for International Application No. PCT/CN2019/082724 dated Jul. 15, 2019; 11 pages.

Office Action with English Translation of Notice of Reasons for Refusal for Japanese Patent Application No. 2020-565018 dated Oct. 26, 2021, 4 pages.

Office Action with English Translation of Concise Explanation of Relevance for Chinese Patent Application No. 201810621056.7 dated Mar. 23, 2021; 7 pages.

He GuangPeng; "Design and Implementation of 3D Realtime Graphics Rendering Framework", Southwest Jiaotong University Master Degree Thesis, Publication Date: Sep. 15, 2014, 114 pages.

Office Action for European Patent Application No. 19819038.1 dated Nov. 16, 2021; 7 pages.

Office Action for European Patent Application No. 19819038.1 dated May 13, 2022, 5 pages.

\* cited by examiner

Schematic diagram of rendering time intervals and statistical times of adjacent frames of a display interface of a virtual scene C Schematic diagram of rendering time intervals and statistical times of adjacent frames of a display interface of a virtual scene D

METHOD AND APPARATUS FOR TRANSMITTING SCENE IMAGE OF VIRTUAL SCENE, COMPUTER DEVICE, AND COMPUTER-READABLE STORAGE MEDIUM

RELATED APPLICATION

This application is a continuation application of the International PCT Application No. PCT/CN2019/082724, filed with the National Intellectual Property Administration, PRC on Apr. 15, 2019 which claims priority to Chinese Patent Application No. 2018106210567, entitled "METHOD FOR TRANSMITTING SCENE IMAGE OF VIRTUAL SCENE, COMPUTER DEVICE, AND STORAGE MEDIUM" and filed with the National Intellectual Property Administration, PRC on Jun. 15, 2018, which are incorporated herein by reference in their entireties.

FIELD OF THE TECHNOLOGY

Embodiments of this disclosure relate to the technical field of image processing, and in particular, to a method and an apparatus, a computer device, and a computer-readable storage medium for transmitting a scene image of a virtual scene.

BACKGROUND OF THE DISCLOSURE

With the continuous development of networks and electronic technologies, the range of online cloud applications becomes increasingly wide. A cloud virtual scene, for example, cloud gaming, is a relatively important one of the online cloud applications.

In the related art, the image rendering process of a cloud virtual scene is performed on a server. According to an aspect, the server acquires an image to be displayed in a virtual scene and renders the image to obtain a rendered image. According to another aspect, the server determines, according to a constant frame rate, whether there is a rendered image needs to be encoded at every predetermined interval. If yes, the rendered image is encoded and transmitted to a terminal, and the terminal decodes the obtained rendered image and displays the image.

SUMMARY

According to various embodiments of this disclosure, a method, a computer device and a computer-readable storage medium for transmitting a scene image of a virtual scene are provided.

A method for transmitting a scene image of a virtual scene is provided, performed by a server, the method including:
rendering a first image to obtain a first rendered image, wherein the first image is obtained through display data acquisition of a virtual scene when the display data changes;
acquiring a first time point at which the rendering of the first image is completed;
encoding the first rendered image to obtain an encoded image if an interval between the first time point and a second time point is not less than a first interval threshold, wherein the second time point is a time point at which image encoding is performed last time; and
transmitting the encoded image to a terminal for decoding and displaying.

An apparatus for transmitting a scene image of a virtual scene is provided, the apparatus including:
a rendering module, configured to render a first image to obtain a first rendered image, wherein the first image is obtained through display data acquisition of a virtual scene when the display data changes;
a time point acquisition module, configured to acquire a first time point at which the rendering of the first image is completed;
an encoding module, configured to encode the first rendered image to obtain an encoded image if interval between the first time point and a second time point is not less than a first interval threshold, wherein the second time point is a time point at which image encoding is performed last time; and
a transmission module, configured to transmit the encoded image to a terminal for decoding and displaying.

A computer device is provided, the computer device including a processor and a memory, the memory storing at least one instruction, at least one program, a code set or an instruction set, the at least one instruction, the at least one program, the code set or the instruction set being loaded and executed by the processor to implement the foregoing method for transmitting a scene image of a virtual scene.

A computer-readable storage medium is provided, the storage medium storing at least one instruction, at least one program, a code set or an instruction set, the at least one instruction, the at least one program, the code set or the instruction set being loaded and executed by a processor to implement the foregoing method for transmitting a scene image of a virtual scene.

Details of one or more embodiments of this disclosure are provided in the accompany drawings and descriptions below. Other features and advantages of this disclosure become more obvious with reference to the specification, the accompanying drawings, and the claims.

BRIEF DESCRIPTION OF THE DRAWINGS

To describe the technical solutions in the embodiments of this application more clearly, the following briefly introduces the accompanying drawings required for describing the embodiments. Apparently, the accompanying drawings in the following description show merely some embodiments of this application, and a person of ordinary skill in the related art may still derive other drawings from accompanying drawings without creative efforts.

DESCRIPTION OF EMBODIMENTS

Exemplary embodiments are described in detail herein, and examples thereof are shown in the accompanying drawings. When the following descriptions are made with reference to the accompanying drawings, unless indicated otherwise, same numbers in different accompanying drawings represent same or similar elements. The following implementations described in the following exemplary embodiments do not represent all implementations that are consistent with this application. On the contrary, the implementations are merely examples of apparatuses and methods that are described in detail in the appended claims and that are consistent with some aspects of this application.

An embodiment of this application provides an image display solution. The solution can synchronize scene parameters of a virtual scene when a plurality of users are in a face-to-face state. For convenience of understanding, terms in the embodiments of this application are described.

(1) Cloud gaming: Cloud gaming is a game mode based on cloud computing. In cloud gaming, all games are run on a server. The server compresses a rendered game picture and transmit the compressed game picture to a terminal on a user side by a network, and the game picture is decoded and directly displayed by the terminal.

(2) A virtual scene is a virtual scene environment generated by using a computer. For example, the virtual scene may be a game scene. The virtual scene may provide a multimedia virtual world, which may allow a user to use an operation device or an operation interface to control an operable virtual object in the virtual scene to observe an object, a character, and scenery or the like in the virtual scene from the viewing angle of the virtual object or use the virtual object to interact with an object, a character, scenery or another virtual object in the virtual scene. For example, the user may operate a virtual soldier to attack a target enemy.

The virtual scene is usually generated by an application on a computer device such as a terminal and displayed by hardware (for example, a screen) of the terminal. The terminal may be any mobile device such as a smartphone, a tablet computer or an ebook reader. Alternatively, the terminal may be a personal computer device such as a laptop or a desktop computer.

Figure 1:
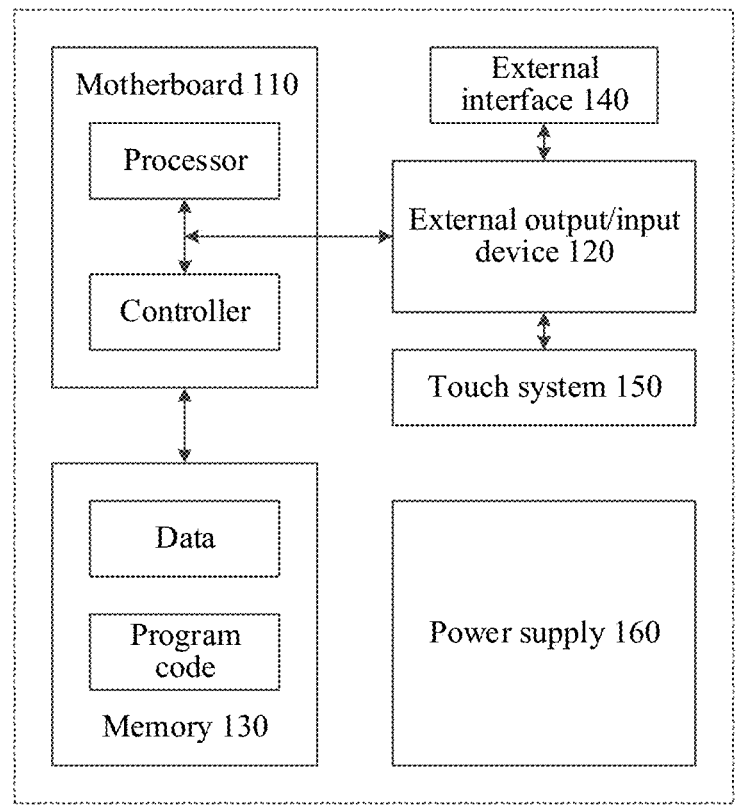
FIG. 1 is a schematic structural diagram of a terminal according to an exemplary embodiment.

FIG. 1 is a schematic structural diagram of a terminal according to an exemplary embodiment. As shown in FIG. 1, the terminal includes a motherboard 110, an external output/input device 120, a memory 130, an external interface 140, a capacitive touch system 150, and a power supply 160.

Processing elements such as a processor and a controller are integrated in the motherboard 110.

The external output/input device 120 may include a display component (for example, a display screen), a sound playing component (for example, a loudspeaker), a sound acquisition component (for example, a microphone), and various types of buttons.

The memory 130 stores program code and data.

The external interface 140 may include an earphone interface, a charging interface, and a data interface.

The touch system 150 such as a capacitive touch system may be integrated in the display component or the buttons of the external output/input device 120, and the capacitive touch system 150 is configured to detect a touch operation performed by a user on the display component or the buttons.

The power supply 160 is configured to supply power to other components in the terminal.

In an embodiment of this application, the processor in the motherboard 110 may generate an image of a virtual scene by executing or invoking program code and data stored in the memory, and present the generated image of the virtual scene by using the external output/input device 120. The data used for generating the image of the virtual scene may be data, transmitted by a cloud server, of a rendered image. In the process of presenting the virtual scene, a touch operation performed if the user interacts with the virtual scene may be detected by using the capacitive touch system 150.

Figure 2:
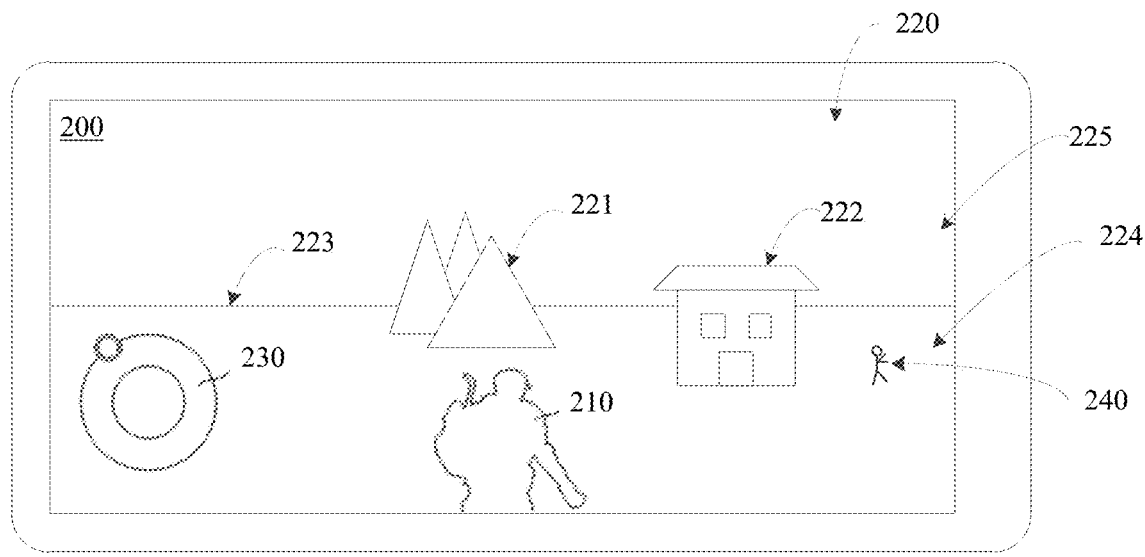
FIG. 2 is a schematic diagram of a display interface of a virtual scene according to an exemplary embodiment.

The virtual scene may be a three-dimensional virtual scene, or the virtual scene may be a two-dimensional virtual scene. Using a three-dimensional virtual scene as an example, FIG. 2 is a schematic diagram of a display interface of a virtual scene according to an exemplary embodiment. As shown in FIG. 2, a display interface 200 of a virtual scene includes a virtual object 210, an environment picture 220 of the three-dimensional virtual scene, at least one group of virtual control buttons 230, and a virtual object 240. The virtual object 210 may be a current controlled object of a user account corresponding to a terminal. The virtual control button 230 is a selectable control element. That is, the user may operate the virtual object 210 by using the virtual control button 230. The virtual object 240 may be a non-user controlled object. That is, the virtual object 240 is autonomously controlled by an application or the virtual object 240 may be a virtual object controlled by a user account corresponding to another terminal. The user may control the virtual object 210 to interact with the virtual object 240, for example, control the virtual object 210 to attack the virtual object 240.

In FIG. 2, the virtual object 210 and the virtual object 240 are three-dimensional models in the three-dimensional virtual scene, and the environment picture of the three-dimensional virtual scene displayed in the display interface 200 includes objects observed from a viewing angle of the virtual object 210. For example, as shown in FIG. 2, as observed from the viewing angle of the virtual object 210, the displayed environment picture 220 of the three-dimensional virtual scene includes the ground 224, the sky 225, the horizon 223, hills 221, and a factory 222.

The virtual object 210 may move in real time under the control of the user. For example, the virtual control button 230 shown in FIG. 2 is a virtual button configured to control the movement of the virtual object 210. If the user touches the virtual control button 230, the virtual object 210 may move in a direction of a touch point relative to the center of the virtual control button 230 in the virtual scene.

Figure 3:
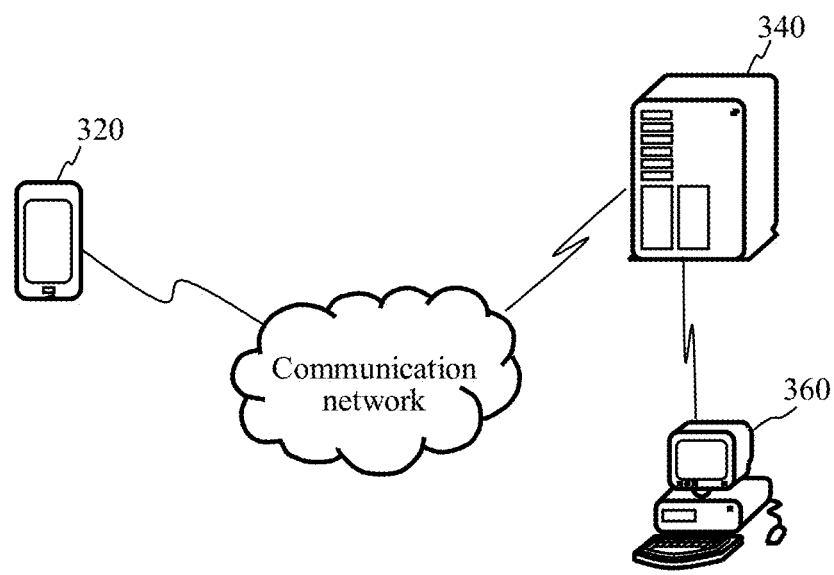
FIG. 3 is a schematic structural diagram of a system for transmitting a scene image according to an exemplary embodiment.

FIG. 3 is a schematic structural diagram of a system for transmitting a scene image of a virtual scene according to an exemplary embodiment. The system includes a plurality of terminals 320 and a server 340.

The terminal 320 may be a mobile phone, a tablet computer, an ebook reader, smart glasses, a smartwatch, a Moving Picture Experts Group Audio Layer III (MP3) player, a Moving Picture Experts Group Audio Layer IV (MP4) player or the like.

The terminal 320 may be a terminal configured to present a display interface of a virtual scene. Correspondingly, the server 340 may be a server corresponding to an application that supports a virtual scene.

The terminal 320 is connected to the server 340 by a communication network. Optionally, the communication network is a wired network or a wireless network.

The server 340 is a server or a server cluster including a plurality of servers, or a virtualization platform, or a cloud computing service center.

Optionally, the system may further include a management device 360. The management device 360 is connected to the server 340 by a communication network. Optionally, the communication network is a wired network or a wireless network.

Optionally, the wireless network or the wired network uses a standard communications technology and/or protocol. The network is usually the Internet, but may be any other network, including but not limited to a local area network (LAN), a metropolitan area network (MAN), a wide area network (WAN), a mobile, wired, or wireless network, or any combination of a dedicated network or a virtual dedicated network. In some embodiments, technologies and/or formats such as hypertext markup language (HTML) and extensible markup language (XML) are used to represent data exchanged through a network. In addition, all or some links may be encrypted by using conventional encryption technologies such as a secure socket layer (SSL), transport layer security (TLS), a virtual private network (VPN), and internet protocol security (IPsec). In some other embodiments, custom and/or dedicated data communications technologies may also be used in place of or in addition to the foregoing data communication technologies.

Figure 4:
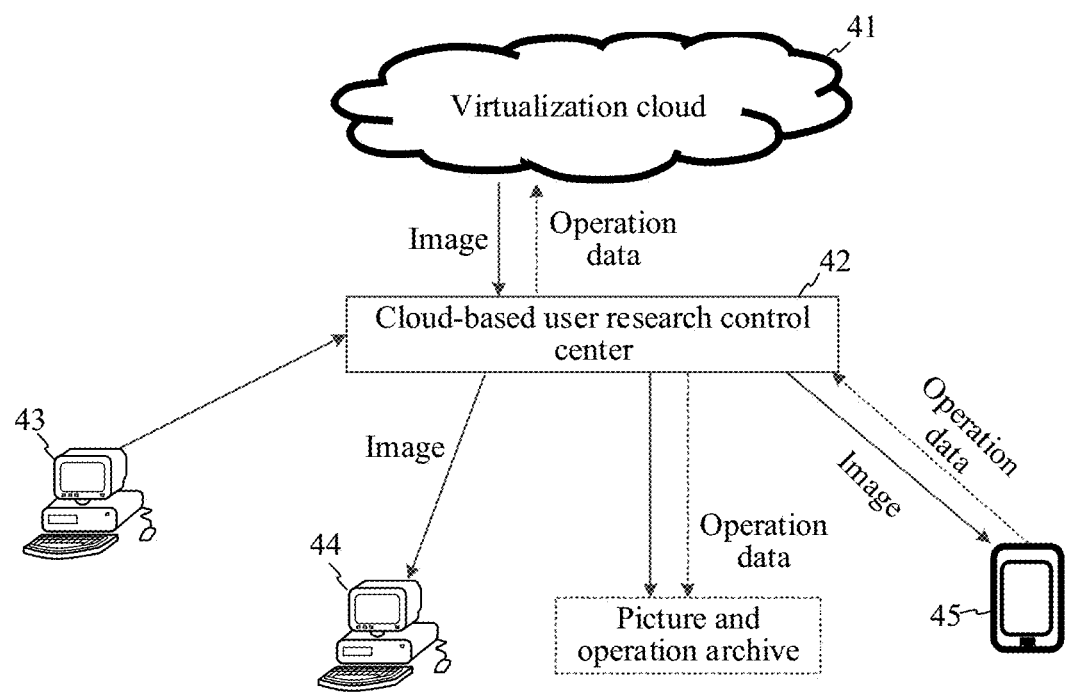
FIG. 4 is a system architecture diagram of a cloud gaming system in the embodiment in FIG. 3.

In a possible implementation, the foregoing system for transmitting a scene image of a virtual scene may be a cloud gaming system. For example, FIG. 4 is a system architecture diagram of a cloud gaming system in the embodiment of this application. As shown in FIG. 4, the cloud gaming system includes a virtualization cloud 41, a cloud-based user research control center 42, a management personnel device 43, a user research personnel terminal 44, and a player terminal 45. The virtualization cloud 41 and the cloud-based user research control center 42 are deployed on the server 340. The management personnel device 43 corresponds to the management device 360, while the user research personnel terminal 44 and the player terminal 45 correspond to the terminal 320.

As shown by the system in FIG. 4, the virtualization cloud 41 may be a virtual machine running on a hardware device, and a simulator (for example, an Android simulator, a Windows simulator, an iOS simulator, and a Web simulator) runs on top of the virtual machine. The simulator is configured to simulate a system environment of the player terminal 45, generate a virtual scene (that is, a scene corresponding to a game or an app) based on a game program run by the simulated system environment, and transmit an image of the virtual scene to the player terminal 45 and the user research personnel terminal 44 by using the cloud-based user research control center 42 for displaying. In the process of displaying the image of the virtual scene, the player terminal 45 further receives operations from a player and transmits operation data of the player to the cloud-based user research control center 42, and the cloud-based user research control center 42 transmits the operation data to the virtualization cloud 41. The simulator running in the virtualization cloud 41 controls the virtual scene according to the operation data of the player. For example, in an embodiment of this application, the virtualization cloud 41 may encode the picture and sound of the virtual scene generated by the virtual machine into H.264/advanced audio coding (AAC) audio and video streams, and transmit the audio and video streams to a client installed and running on the terminal. There is no limitation imposed on the video/audio encoding scheme in this application. At the same time, a touch operation event of the client is acquired and transmitted back to the simulator of the virtualization cloud 41 to operate the game or app.

In addition, the cloud-based user research control center 42 further archives pictures of the virtual scene and operations of the user.

Figure 5:
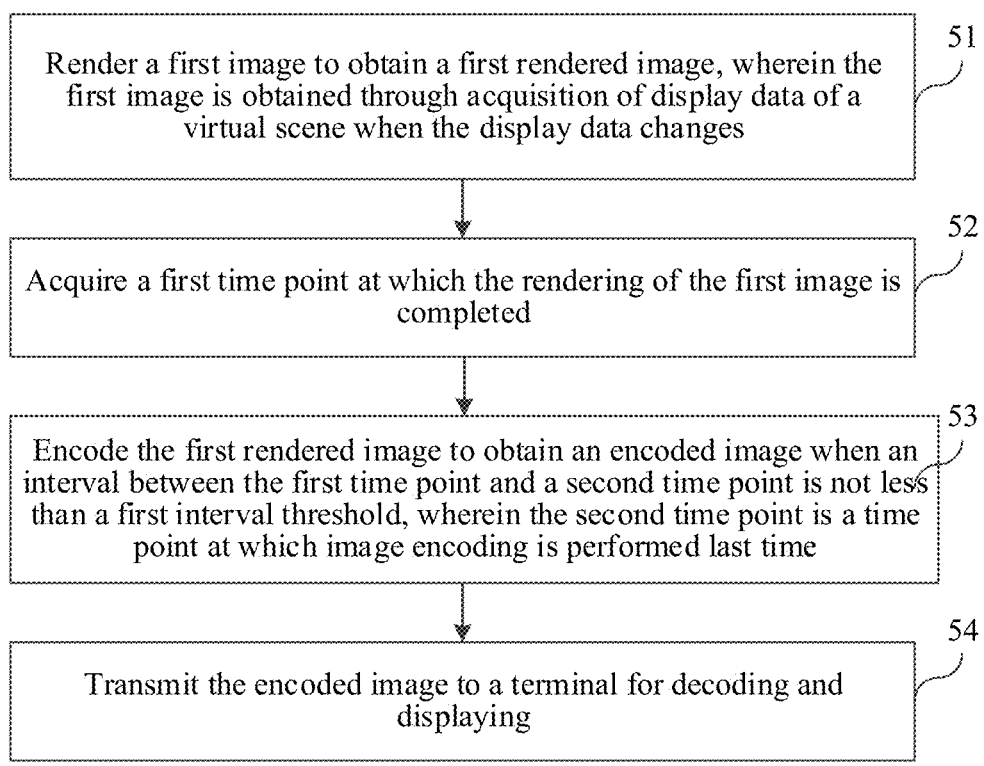
FIG. 5 is a flowchart of transmission of a scene image of a virtual scene according to an exemplary embodiment.

In the solution of this application, a process of performing image encoding by a server may be improved to reduce a delay of presenting a virtual scene on a terminal. FIG. 5 is a flowchart of transmission of a scene image of a virtual scene according to an exemplary embodiment. As shown in FIG. 5, a server renders a first image to obtain a first rendered image, the first image being obtained by acquiring display data of a virtual scene when the display data changes (51). The server acquires a first time point at which the rendering of the first image is completed (52). The server encodes the first rendered image to obtain an encoded image if interval between the first time point and a second time point is not less than a first interval threshold, the second time point being a time point at which image encoding is performed last time (53). The server transmits the encoded image to a terminal for decoding and displaying (54).

By using the solution in FIG. 5, the server generates a virtual scene and acquires a first image to be rendered and performs rendering if display data of the virtual scene changes, to obtain a first rendered image. If an interval between a time point at which the rendering of the first rendered image is finished and a time point at which image encoding is performed last time is not less than a particular threshold, the first rendered image is encoded and transmitted, and it is not necessary to wait for the arrival of a next constant encoding cycle, so that the timeliness of image encoding is improved and a delay of image presentation on a terminal side is reduced.

In addition, in the solution in FIG. 5, the server only acquires the image to be rendered for rendering if the display data of the virtual scene changes, so that unnecessary steps of rendering and encoding are reduced on the server side and the utilization of network resources is improved.

Figure 6:
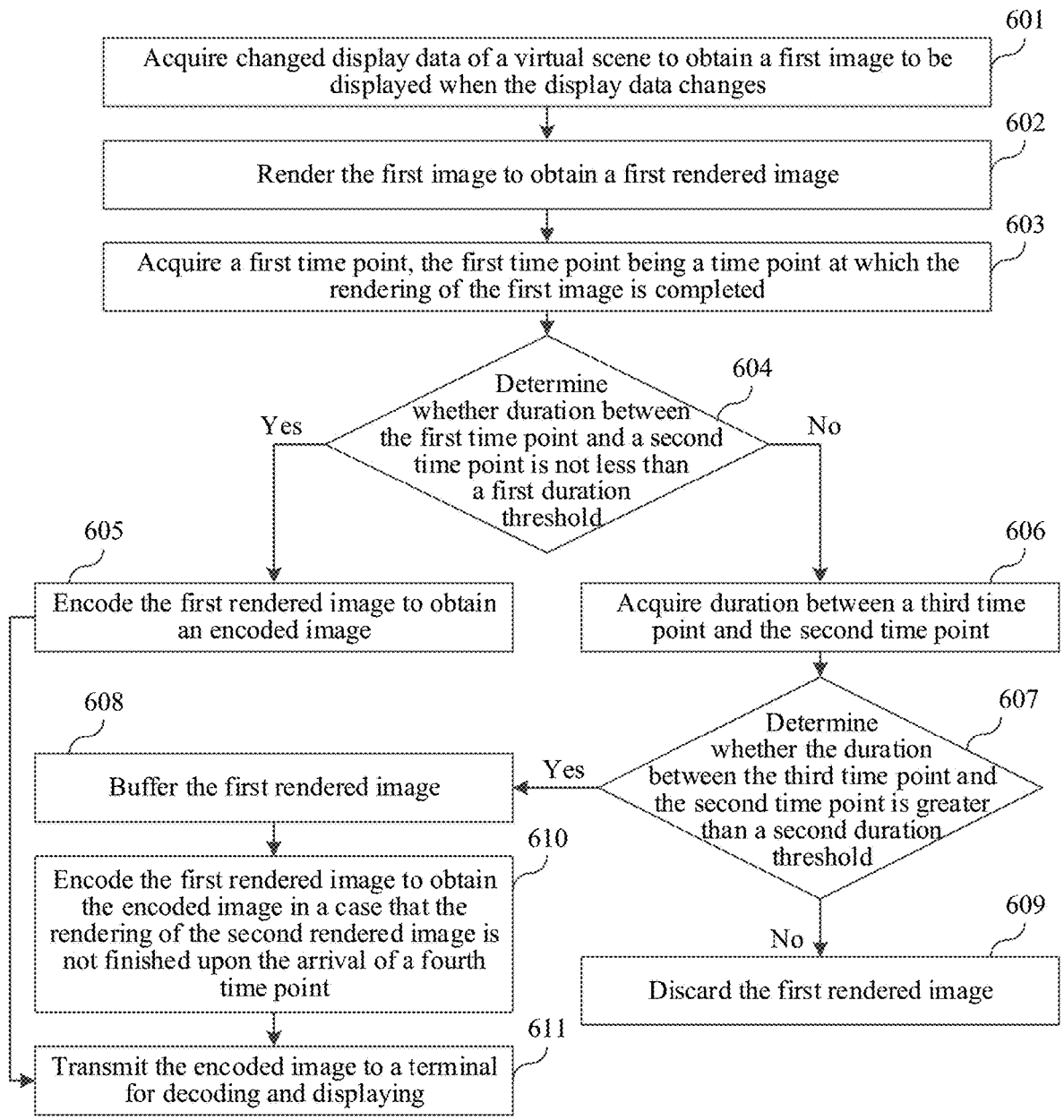
FIG. 6 is a flowchart of transmission of a scene image of a virtual scene according to an exemplary embodiment.
Figure 7:
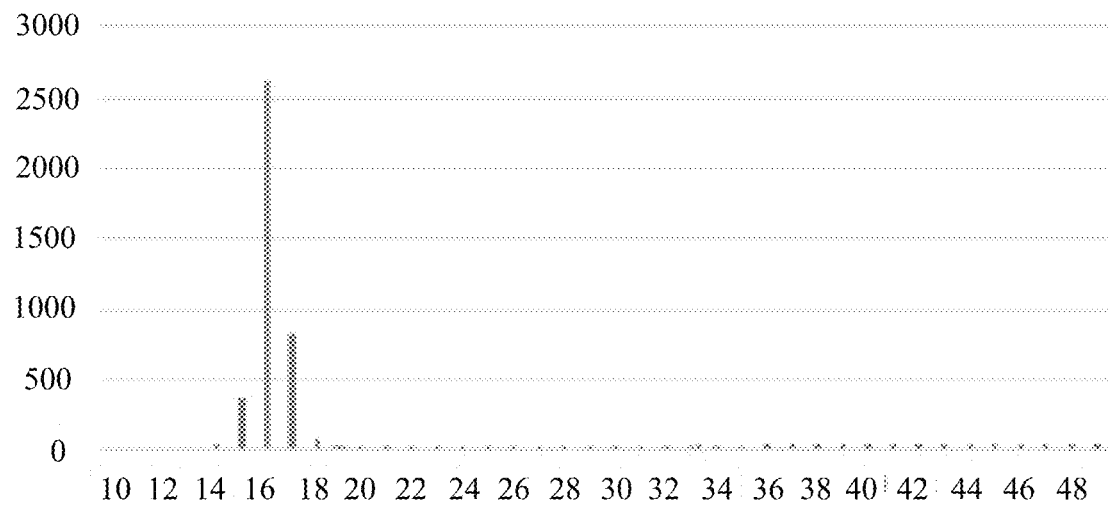
FIG. 7 to FIG. 10 are four schematic diagrams of rendering time intervals and statistical times of adjacent frames of a display interface of an application or a virtual scene in the embodiment in FIG. 6.
Figure 8:
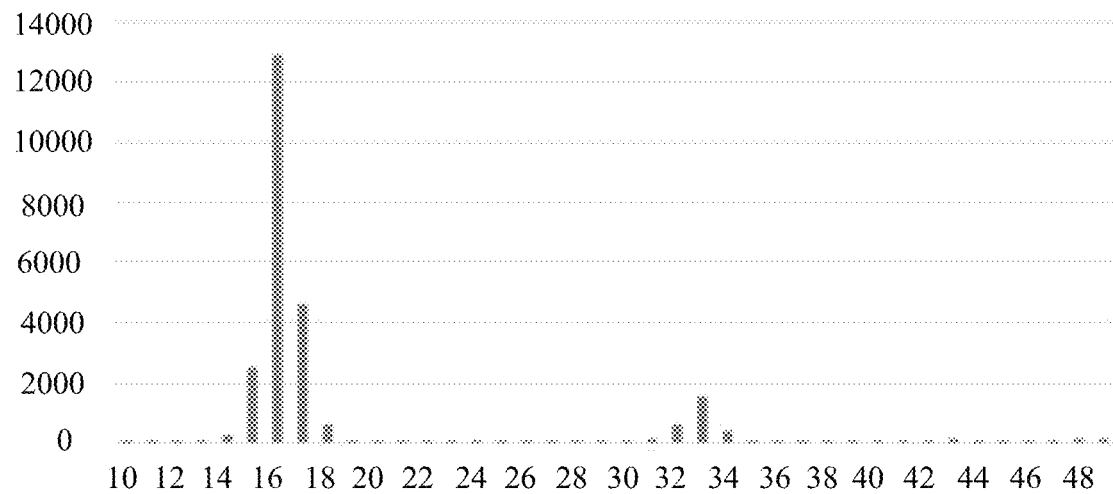
Figure 9:
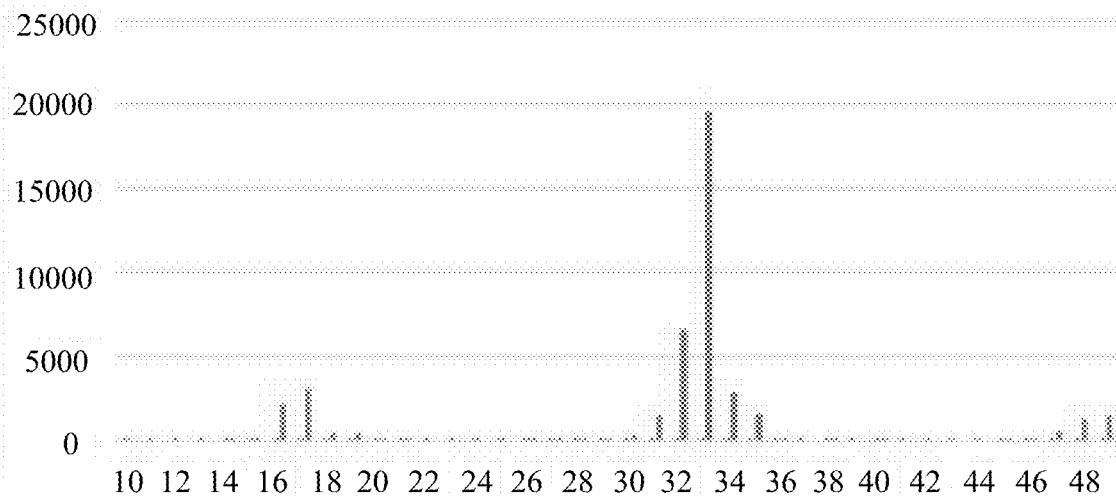
Figure 10:
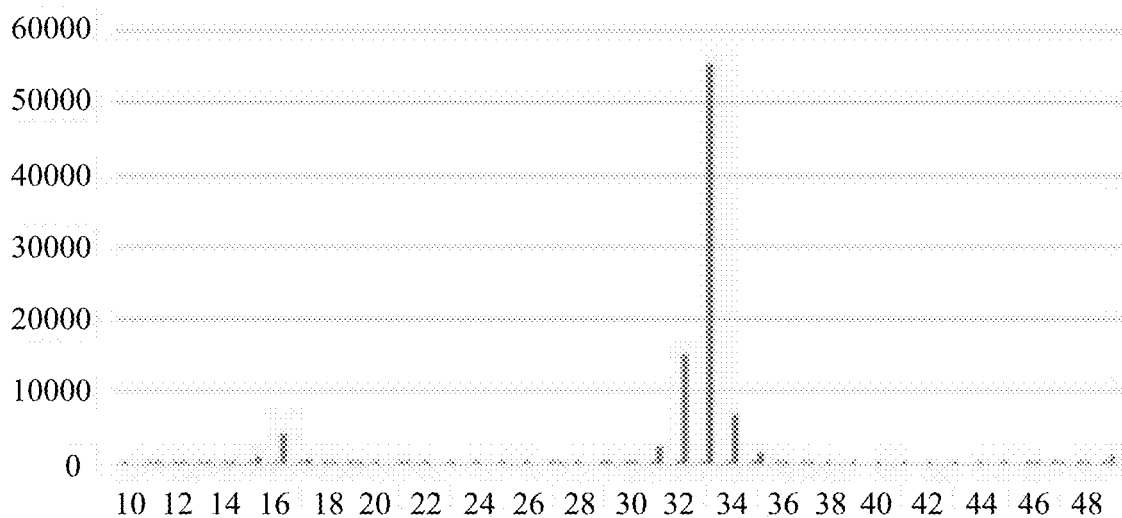

FIG. 6 is a flowchart of a method for transmitting of a virtual scene image according to an exemplary embodiment. The method for transmitting of a virtual scene image may be applied to the server of the system in FIG. 3. As shown in FIG. 6, the method for transmitting a scene image of a virtual scene may include the following steps.

Step 601. Acquire changed display data of a virtual scene to obtain a first image to be displayed if the display data changes.

The display data may be image data that is used for displaying the virtual scene on a display interface. The display interface of the virtual scene may be used to display the virtual scene on a terminal. For the same virtual scene, display interfaces of the virtual scene displayed on different terminals may be the same or different.

In an embodiment of this application, after the server generates the virtual scene, interface content (that is, display data) in the display interface of the virtual scene may be monitored. If a change in the interface content is detected, an interface image is acquired to obtain the image to be displayed. Otherwise, if no change is detected in the interface content, the interface image may not need to be acquired.

For example, in one actual application, the server may perform on-demand rendering by using a virtual machine such as Qemu (a pure software implemented virtualization simulator that is configured to simulate a hardware device) and a virtualization module such as KVM (an open source system virtualization module). Based on embodiments of this disclosure, OpenGL (Open Graphics Library) image rendering is performed only when the interface content changes.

Step 602. Render the first image to be displayed to obtain a first rendered image.

Using the simulation of an Android system environment is used as an example. An Android simulator invokes the eglSwapBuffers function in the simulated Android system to render final screen content.

In one embodiment of this application, after the rendering of a frame of image is finished, the virtual machine may add callback to a code where the rendering is finished, to trigger a subsequent process of determining whether further encoding is required. The callback may be, and is not limited to, a callback function or a hook to the callback function, and there is no limitation imposed in this disclosure.

Step 603. Acquire a first time point, the first time point being a time point at which the rendering of the first image is completed.

For example, the virtual machine in the server renders the image to be displayed. When the rendering is finished, the virtual machine may acquire this time point as the first time point.

Step 604. Determine whether interval between the first time point and a second time point is not less than a first interval threshold. If yes, step 605 is performed. Otherwise, step 606 is performed.

The second time point is a time point at which image encoding is performed last time.

In actual application, different terminals have different performance parameters. Some terminals have relatively high hardware performance to support image decoding and displaying with a high frame rate, while some terminals have relatively low hardware performance may only support image decoding with a low frame rate.

In an embodiment of this application, in consideration of the decoding performance of a low-performance terminal, a minimum encoding interval (that is, the first interval threshold) may be set and adjusted in the server. After rendering the last frame of image, the server may determine whether a current rendered image needs to be encoded and transmitted to terminal on a user side immediately.

Step 605. Encode the first rendered image to obtain the encoded image.

In an embodiment of this application, if it is determined that interval between the time point at which the rendering of the first rendered image is finished and a time point at which encoding is performed last time is the same as or greater than the minimum encoding interval, the server may encode the newly obtained rendered image immediately.

For example, $T_n$ represents a time point at which the rendering of a current image (that is, the first rendered image) is finished, $E_{last}$ represents a time point at which encoding is performed most recently before $T_n$, and $I_{min}$ represents a minimum interval allowed by encoding, that is, the first interval threshold. In a condition that $T_n-E_{last} \geq I_{min}$, the server encodes the current image immediately and updates $E_{last}$ with $T_n$.

Step 606. Acquire an interval between a third time point and the second time point.

The third time point is a time point at which the rendering of a second image to obtain a second rendered image is estimated to be completed. The second rendered image is the next frame of the first rendered image.

In an embodiment of this application, the third time point may be obtained by prediction. For example, the server may refer to a time point at which the rendering of each previous frame of image of the first image is completed to predict a time point at which the rendering of a next frame of image (that is, the third time point) is completed.

Optionally, when estimating the third time point, the server may acquire time points at which rendering of each previous image of the first image is completed, and acquire the third time point according to both the first time point and rendering time intervals between every adjacent pair of previously rendered images.

In a possible implementation, the server may calculate an average value of the rendering time intervals between every adjacent pair of previously rendered images, to obtain an average time interval, then add the average time interval to the first time point to obtain the third time point.

In an embodiment of this application, the server only acquires and renders an image if the display data of the virtual scene changes. Therefore, the aforementioned rendering time interval may be very large. For example, if the display interface of the virtual scene remains unchanged for a long time, then the rendering time interval between two adjacent frames of image may be large. On the other hand, the rendering time interval may be very small. For example, if the display interface of the virtual scene changes frequently, the rendering time interval may be small. Therefore, when the server acquires the third time point, the time point at which the rendering of every previously rendered image of the first image is completed may play an important role on predicting the next rendering time point.

In actual application, the rendering interval which is closer to a current time point usually has higher impact on a prediction result of the next rendering time point. For example, if the rendering interval of an adjacent pair of recent images is relatively large, then the rendering interval between the current image and the next image is highly likely to be large. Conversely, if the rendering interval of an adjacent pair of recent images is relatively small, then the rendering interval between the current image and the next image is likely to be small, too.

Based on the foregoing analysis, in an embodiment of this application, the server may calculate the third time point $T_{n+1}$ using the following formula:

$$T_{n+1} = T_n + \sum_{i=1}^{n} \left( \frac{T_{n+1-i} - T_{n-i}}{2^i} \right),$$

$T_{n+1}$ is the third time point, $T_n$ is the first time point, and $T_{n-1}$ is a time point at which the rendering of the previous $i^{th}$ frame of image before the first rendered image is finished. As shown in the formula, the rendering interval between rendered images that are closer to the current time point usually has higher impact on a prediction result of $T_{n+1}$. A rendering interval between the first and second previous rendered images has the highest impact on the prediction result (that is, having the largest weight). The impact of an interval between time points at which the rendering of every two subsequent adjacent frames of image is finished on the prediction result decreases exponentially (that is, the weight decreases exponentially) when i increases.

Step 607. Determine whether the interval between the third time point and the second time point is greater than a second interval threshold. If yes, step 608 is performed. Otherwise, step 609 is performed.

The second interval threshold is set to be greater than the first interval threshold.

In an embodiment of this application, once the rendering of the first image is finished, if the rendering interval between the first rendered image and the previous rendered image is less than the minimum encoding interval, assuming the first rendered image is encoded and transmitted to the terminal, a problem occurs such that some terminals with relatively low performance are still decoding and displaying an image in the last frame and are unable to decode and display the current image. This may be considered as an "overfeed" scenario. Therefore, in this case, the server uses the foregoing step to predict a time point at which the rendering of a next frame of image will finish to determine whether the current rendered image (that is, the first rendered image) needs to be kept and stored in a buffer. By storing rendered image in the buffer, the server may skip the rendering process and encode the buffer rendered image for the next frame of image, which saves computation resources and further speeds up the general encoding process.

Step 608. Buffer the first rendered image.

In an embodiment of this application, in order to enable the terminal to present the latest changed virtual scene to the user in time, the server may preset a maximum encoding frame interval $I_{max}$. If $T_{n+1}-E_{last}>I_{max}$, it indicates no new image may need to be rendered till the next encoding time point. To understand this in another way, since the next new image is predicted to come after the next encoding time point, the server may not wait and the next encoding may not use the next new image. In this scenario, the server may buffer the current rendered image and use the buffered image for the next encoding.

According to the foregoing analysis, the main objective of $I_{min}$ is to set a maximum encoding rate that can be accepted by a user terminal (to avoid a case where the transmission is too fast for the user terminal to perform decoding), while $I_{max}$ is mainly used for ensuring a minimum refreshing rate so the user may see the latest picture in time. At each interval of $I_{max}$, the server tries to acquire an image that is generated most recently and has not been encoded, perform encoding in time, and transmit the image to the user terminal.

In an embodiment of this application, the server may collect statistics of encoding and decoding capabilities of different makes and models of mobile terminals supported by the system in advance to obtain a frame rate range that may be accepted by most of the terminals. $I_{min}$ and $I_{max}$ are determined based on the frame rate range of mobile terminals in combination with the statistics of refresh frame rates of various virtual scenes in actual application.

FIG. 7 to FIG. 10 are four schematic diagrams of rendering time intervals and statistical times of corresponding to the particular rendering interval in an application or a virtual scene in the embodiment of this application. In actual application, a refresh rate of the display interface of the application or the virtual scene is usually 30 frames per second (FPS) or 60 FPS, and corresponding refresh time intervals are 15 ms and 30 ms, respectively. In FIG. 7 to FIG. 10, a horizontal coordinate is a rendering time interval of adjacent frames in milliseconds, and a vertical coordinate is the number of times corresponding to the particular rendering interval. As shown in FIG. 7 to FIG. 10, in most cases, the rendering time intervals mainly fall in a range of 15 ms to 17 ms and a range of 32 ms to 34 ms, and intervals within the same time period are basically consistent with each other. In combination with a frame rate range that can be accepted by most terminals, in an embodiment of this application, $I_{min}$ and $I_{max}$ may be set to close to 30 ms. For example, $I_{min}$ may be set to 29 ms and $I_{max}$ may be set to 34 ms. Certainly, in actual application, the server may set $I_{min}$ and $I_{min}$ to other values around 30 ms or around another different value, provided that $I_{min}<I_{max}$ is met.

In one embodiment of this application, during buffering of the first rendered image by the server, if a previously rendered image obtained last time exists in the buffer, the server may delete the previously rendered image and buffer the first rendered image. In this way, the server may use the most current rendered image for the encoding and ensure the latest scene to be presented to the user.

Step 609. Discard the first rendered image.

In an embodiment of this application, if $T_{n+1}-E_{last}\leq I_{max}$, it is estimated that before the next encoding, a new image will be rendered (that is, the second rendered image). In order to enable the user to see the latest virtual scene on time, the server may discard the current rendered image without buffering and directly encode the next newly rendered image.

Figure 11:
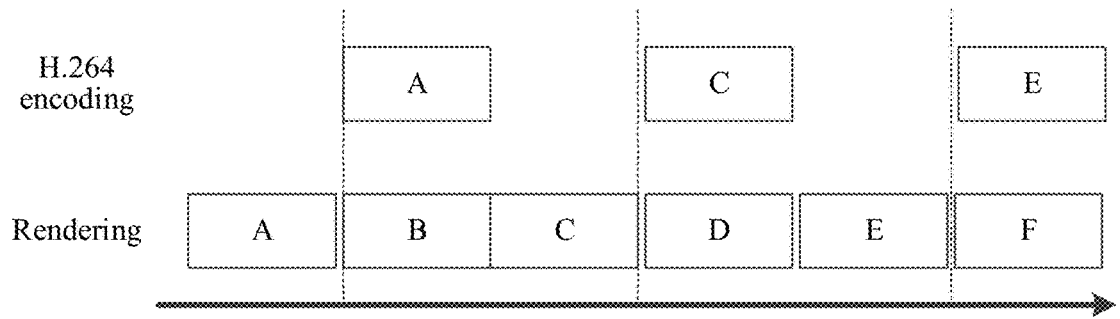
FIG. 11 is a schematic diagram of an image rendering and encoding sequence in the embodiment in FIG. 6.

FIG. 11 is a schematic diagram of an image rendering and encoding sequence in the embodiment of this application. By using the foregoing solution, if a refresh interval of the virtual scene on the display interface mainly falls between 15 ms and 17 ms, in an ideal situation, the server may choose a rendered image from two frames of rendered image, perform video encoding immediately, and transmit the rendered image to the user terminal. As shown in FIG. 11, if $T_n-E_{last}<I_{min}$ and $T_{n+1}-E_{last}\leq I_{max}$, the server discards one of two adjacent frames (a rendered image B, a rendered image D, and a rendered image F are discarded and a rendered image A, a rendered image C, and a rendered image E are encoded in FIG. 11). If the refresh interval of the display interface of the virtual scene mainly falls between 32 ms and 34 ms, in an ideal situation, the cloud server may encode every frame of rendered image.

Figure 12:
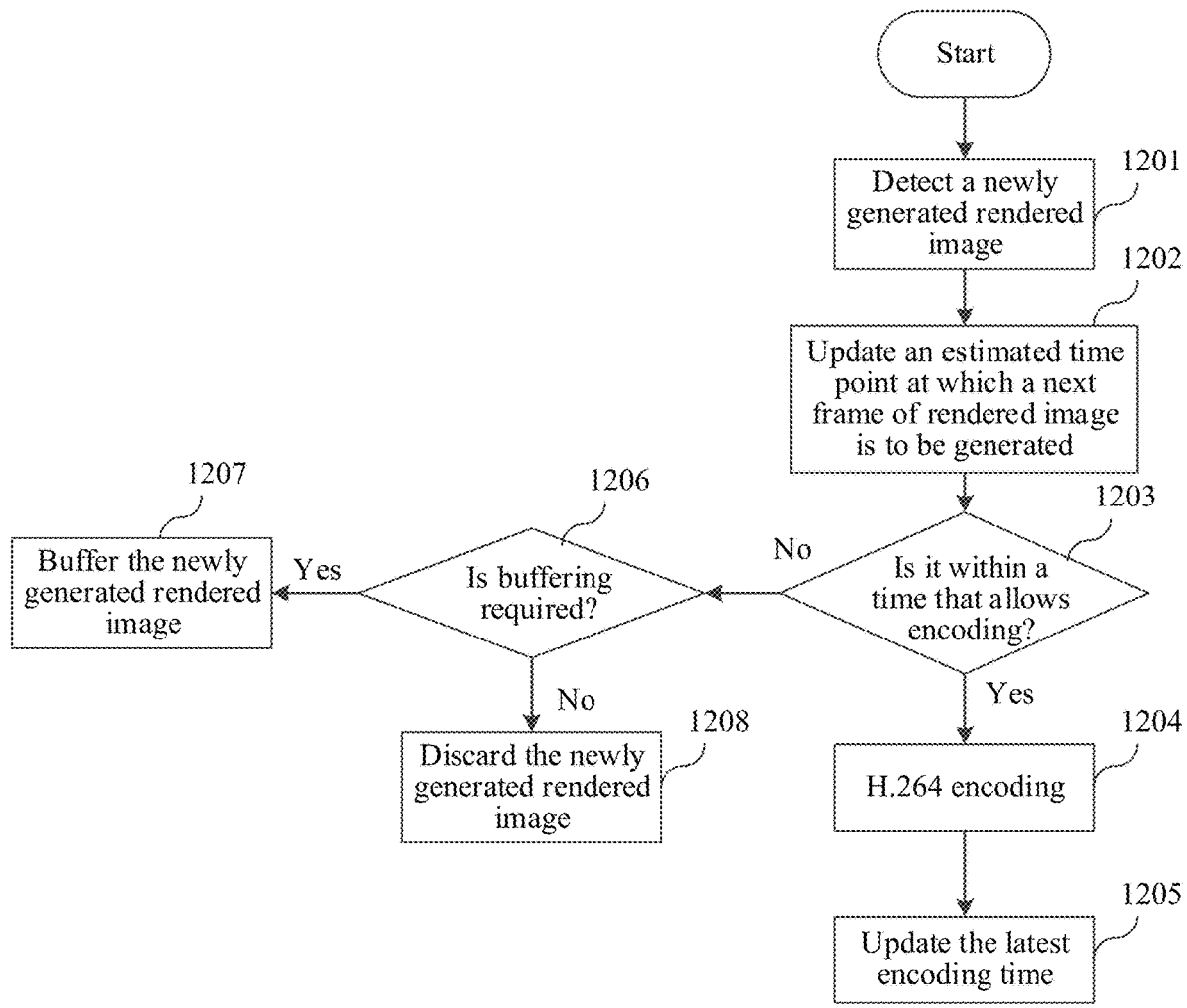
FIG. 12 is a schematic diagram of processing of a newly generated rendered image in the embodiment in FIG. 6.

By using the foregoing solution, the server uses variable dynamic frame rates to encode the newly generated rendered image in real time and combines the decoding capability of the terminal and the rendering frame rate of the server to set appropriate $I_{min}$ and $I_{max}$. FIG. 12 is a schematic diagram of processing of a newly generated rendered image in the embodiment of this application. As shown in FIG. 12, if the server detects a newly generated rendered image (step 1201), an estimated time point at which a next frame of rendered image is to be generated is updated (step 1202), and it is determined whether a current time point (that is, the first time point) is within a time that allows encoding (step 1203), that is, it is determined whether interval between the last encoding time and the current time point is not less than $I_{min}$. If the current time point indicates that encoding may be performed (that is, an interval between last encoding time and the current time point is not less than $I_{min}$), the newly generated rendered image is H.264 encoded (step 1204) and the last encoding time is updated to the current time point (step 1205). If the current time point indicates that encoding may not be performed (that is, the interval between the last time of encoding and the current time point is less than $I_{min}$), it is further determined whether the newly generated rendered image needs to be buffered (step 1206), that is, it is determined whether interval between the last encoding time and the estimated time point of the next frame of rendered image is greater than $I_{max}$. If the newly generated rendered image needs to be buffered (that is, the interval between the last encoding time and the estimated time point of the next frame of rendered image is greater than $I_{max}$), the newly generated rendered image is buffered (step 1207). Conversely, if it is determined that the rendered image does not need to be buffered (that is, the interval between the latest encoding time and the estimated time point of the next frame of rendered image is not greater than $I_{max}$), the newly generated rendered image is discarded (step 1208).

Step 610. Encode the first rendered image to obtain the encoded image if the rendering of the second rendered image is not finished upon the arrival of a fourth time point.

The fourth time point is later than the second time point, and interval between the fourth time point and the second time point is an integer multiple of the second interval threshold.

In an embodiment of this application, in addition to encoding the newly generated rendered image by using dynamic frame rates in real time, the server further performs encoding monitoring of the rendered image in the buffer periodically, so if no new rendered image is available when encoding needs to be performed, the server may use the buffered rendered image for encoding.

Figure 13:
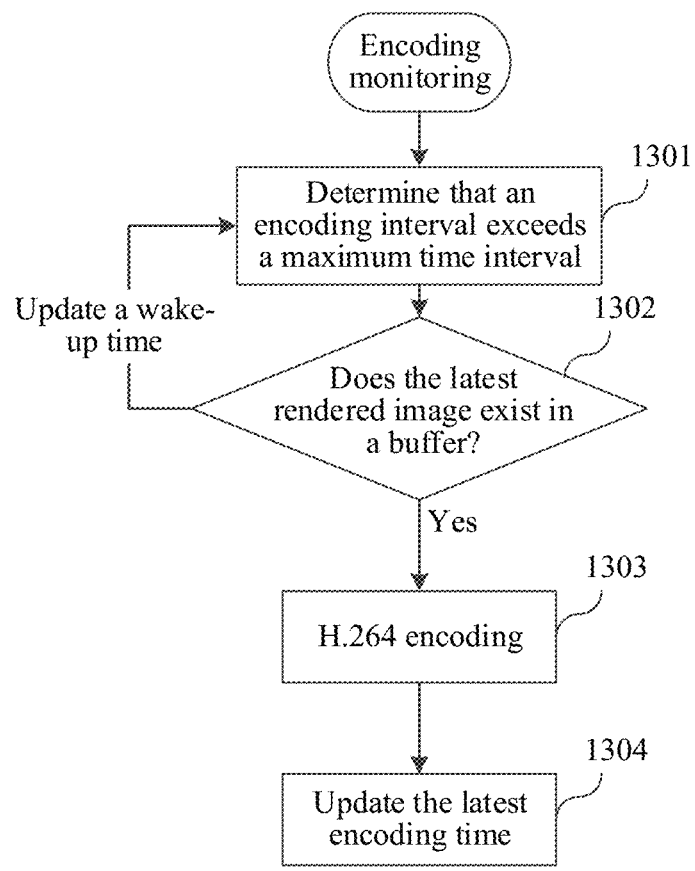
FIG. 13 is a schematic diagram of encoding of a buffered rendered image in the embodiment in FIG. 6.

For example, FIG. 13 is a schematic diagram of encoding a buffered rendered image in one embodiment of this application. As shown in FIG. 13, during encoding monitoring, the server determines and records a wake-up time $e_{last}$. The wake-up time represents a time point at which next encoding is estimated to start. In one embodiment, the wake-up time may be determined by a frame rate requirement.

a) The server determines that an encoding interval exceeds a maximum time interval $I_{max}$ (step 1301), that is, if interval between a current time $T_n$ and the last wake-up time is $I_{max}$, and $T_n \geq e_{last}+I_{max}$, the server determine whether a latest rendered image exists in the buffer (step 1302).
b) If a new rendered image exists in the buffer, this rendered image is encoded (step 1303) by an encoding scheme such as H.264, and the latest encoding time $E_{last}$ is updated to $e_{last}$ after the encoding (step 1304).
c) If a new rendered image does not exist in the buffer, encoding is not performed, and only the wake-up time $e_{last}$ is updated to the sum of the last wake-up time and $I_{max}$.

Figure 14:
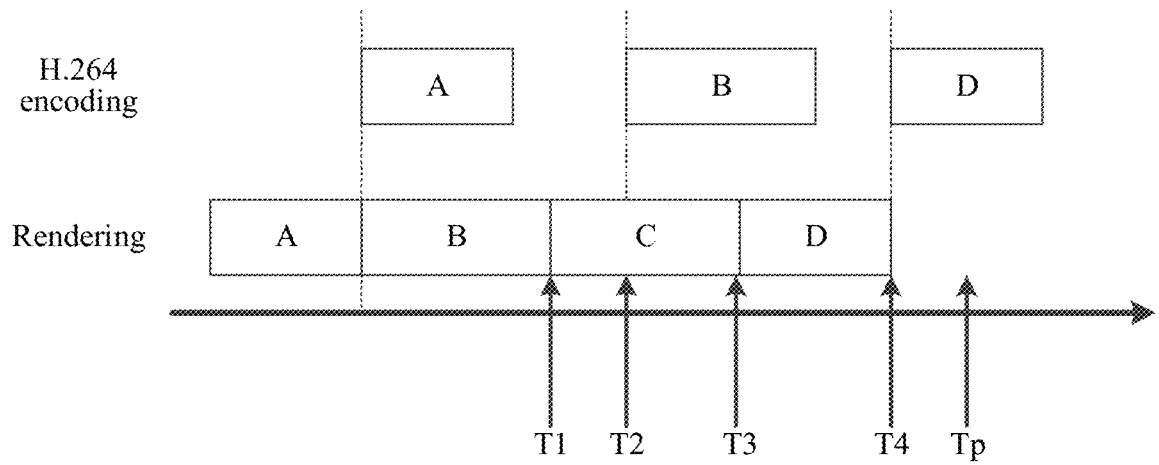
FIG. 14 is another schematic diagram of an image rendering and encoding sequence in the embodiment in FIG. 6.

FIG. 14 is another schematic diagram of an image rendering and encoding sequence in the embodiment of this application. As shown in FIG. 14:

A server has finished the rendering of a rendered image B at a moment T1, and the interval between the moment T1 and a time point at which encoding is performed last time is less than $I_{min}$. Therefore, the rendered image B may not be encoded and transmitted to a client. Moreover, an estimated generation time of a next frame of rendered image C is later than a moment T2 at which encoding needs to be performed next time, therefore the server buffers the rendered image B. At the moment T2, the server finds that the rendered image B exists in the buffer and a previously encoded rendered image is the rendered image A, which indicates rendered image B has not been used in encoding yet. The rendered image B is then encoded and transmitted to a terminal. A rendered image C is generated at a moment T3. Interval between T3 and T2 is less than $I_{min}$, and a next encoding time is T2+$I_{max}$. The server estimates that a generation time of the next frame of rendered image C is Tp, which is later than T2+$I_{max}$, therefore the rendered image C is buffered. However, an actual generation time of the next rendered image D is T4, and T4−T2 is greater than $I_{max}$. Therefore, the server immediately encodes and transmits the rendered image D to the terminal.

By using the solution shown in this application, if the content of the virtual scene (for example, cloud gaming) is not changed, the server may not perform encoding. If no new rendered image is generated upon the arrival of an estimated encoding time, no encoding is performed either, so that fewer processing resources of a server terminal are consumed. Therefor, dynamic frame-rate encoding is combined with conventional constant-rate sampling and encoding in the embodiments of this disclosure.

In the solution of this application and FIG. 11 to FIG. 14, an H.264 encoding scheme is used solely as an example for description. During actual application, the server may encode the rendered image by using another encoding scheme (for example, an H.265 encoding scheme) different from the H.264 encoding scheme. The encoding scheme is not limited in the embodiment of this application.

Step 611. Transmit the encoded image to a terminal for decoding and displaying.

By using a real-time encoding solution in the embodiment of this application, a time interval between the time at which a rendered image is generated and the time at which the rendered image is encoded can be effectively reduced. An experimental result shows that, compared with a solution using constant frame-rate encoding in the related art, the solution in this application can reduce the latency by an average of 16 ms for each frame of image, thereby greatly improving the user experience of cloud gaming. In addition, in the embodiment of this application, if screen content is not changed, no encoding is performed, so that the resource consumption and network transmission traffic caused by performing the image encoding by the server are effectively reduced.

In summary, by using solutions in the embodiment of this application, the server generates the virtual scene and acquires a first image and then renders the first image if the display data of the virtual scene changes, to obtain the first rendered image. If an interval between the rendering of the first rendered image and the encoding of the last image is not less than a particular threshold, the first rendered image is encoded and transmitted, and it is not necessary to wait for the arrival of a next constant encoding cycle, so that the timeliness of image encoding is improved and a delay of image presentation on a terminal side is reduced. In this way, the frame rate may be adjusted dynamically based on the speed at which the real scene changes. A fast real scene change speed indicates a fast frame rate and vice versa.

In addition, by using the solutions in the embodiments of this application, the server only acquires an image to be rendered and performs rendering if the virtual scene changes, therefore reducing unnecessary steps of rendering and encoding thus improving the utilization of network and server resources.

Furthermore, by using the solutions in the embodiments of this application, the first rendered image is buffered if the interval between the first time point and the second time point is less than the first interval threshold and the interval between the third time point and the second time point is greater than the second interval threshold. The first rendered image is encoded and transmitted if the rendering of the second image is not finished or available upon the arrival of a fourth time point. Dynamic frame-rate encoding is combined with conventional constant-rate sampling and encoding to provide a flexible encoding scheme.

Figure 15:
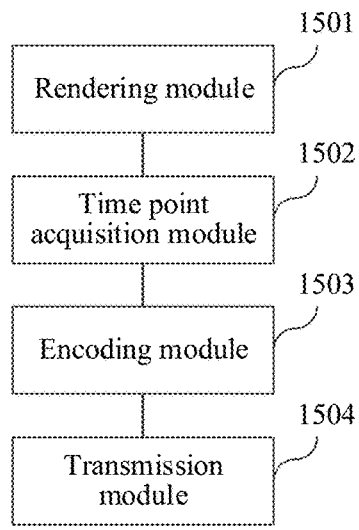
FIG. 15 is a structural block diagram of an apparatus for transmitting a scene image according to an exemplary embodiment.

FIG. 15 is a schematic structural diagram of an apparatus for transmitting a scene image of a virtual scene according to an exemplary embodiment. The apparatus for transmitting a scene image of a virtual scene may be used in a server to perform all or some of the steps performed by the server in the embodiment shown in FIG. 5 or FIG. 6. The apparatus for transmitting a scene image of a virtual scene may include:

a rendering module 1501, configured to render a first image to be displayed to obtain a first rendered image, the image to be displayed being obtained through display data acquisition of a virtual scene when the display data changes;

a time point acquisition module 1502, configured to acquire a first time point, the first time point being a time point at which the rendering of the first image is completed;

an encoding module 1503, configured to encode the first rendered image to obtain an encoded image if interval between the first time point and a second time point is not less than a first interval threshold, the second time point being a time point at which image encoding is performed last time; and a transmission module 1504, configured to transmit the encoded image to a terminal for decoding and displaying.

Optionally, the time point acquisition module 1502 is further configured to acquire a third time point, the third time point being a time point at which the rendering of a second rendered image is estimated to finish, the second rendered image being a next frame of rendered image of the first rendered image; and the apparatus further includes:

an interval acquisition module, configured to acquire time interval between the third time point and the second time point if the interval between the first time point and the second time point is less than the first interval threshold; and a buffer module, configured to buffer the first rendered image if the interval between the third time point and the second time point is greater than a second interval threshold, the second interval threshold being greater than the first interval threshold.

Optionally, if the third time point is acquired, the time point acquisition module 1502 is specifically configured to:

acquire time points of each previously rendered images; and acquire the third time point according to the first time point and the rendering time interval between every adjacent pair of previously rendered images.

Optionally, if the third time point is acquired according to the first time point and the rendering time interval between every adjacent pair of previously rendered images, the time point acquisition module 1502 is specifically configured to:

calculate a third time point $T_{n+1}$ using the following formula:

$$T_{n+1} = T_n + \sum_{i=1}^{n}\left(\frac{T_{n+1-i} - T_{n-i}}{2^i}\right),$$

$T_{n+1}$ being the third time point, $T_n$ being the first time point, $T_{n-i}$ being a time point at which the rendering of the previous $i^{th}$ frame of image before the first rendered image is finished.

Optionally, the encoding module 1503 is further configured to encode, after the first rendered image is buffered, the first rendered image to obtain the encoded image if the rendering of the second rendered image is not yet finished or available upon the arrival of a fourth time point, the fourth time point being later than the second time point, interval between the fourth time point and the second time point being an integer multiple of the second interval threshold.

Optionally, the apparatus further includes:

a discard module, configured to discard the first rendered image without buffering if the interval between the third time point and the second time point is not greater than the second interval threshold.

For a process of implementing the functions of the modules, reference may be made to descriptions in the embodiment in FIG. 5 or FIG. 6.

It is to be understood that although each step of the flowcharts in FIG. 5 and FIG. 6 is shown sequentially according to arrows, the steps are not necessarily performed according to an order indicated by arrows. Unless explicitly specified in this application, the sequence of the steps is not strictly limited, and the steps may be performed in other sequences. Moreover, at least some of the steps in FIG. 5 and FIG. 6 may include a plurality of sub-steps or a plurality of stages. The sub-steps or stages are not necessarily performed at the same moment, but may be performed at different moments. The sub-steps or stages are not necessarily performed sequentially, but may be performed with at least one part of the other steps or sub-steps of other steps or stages in turn.

Figure 16:
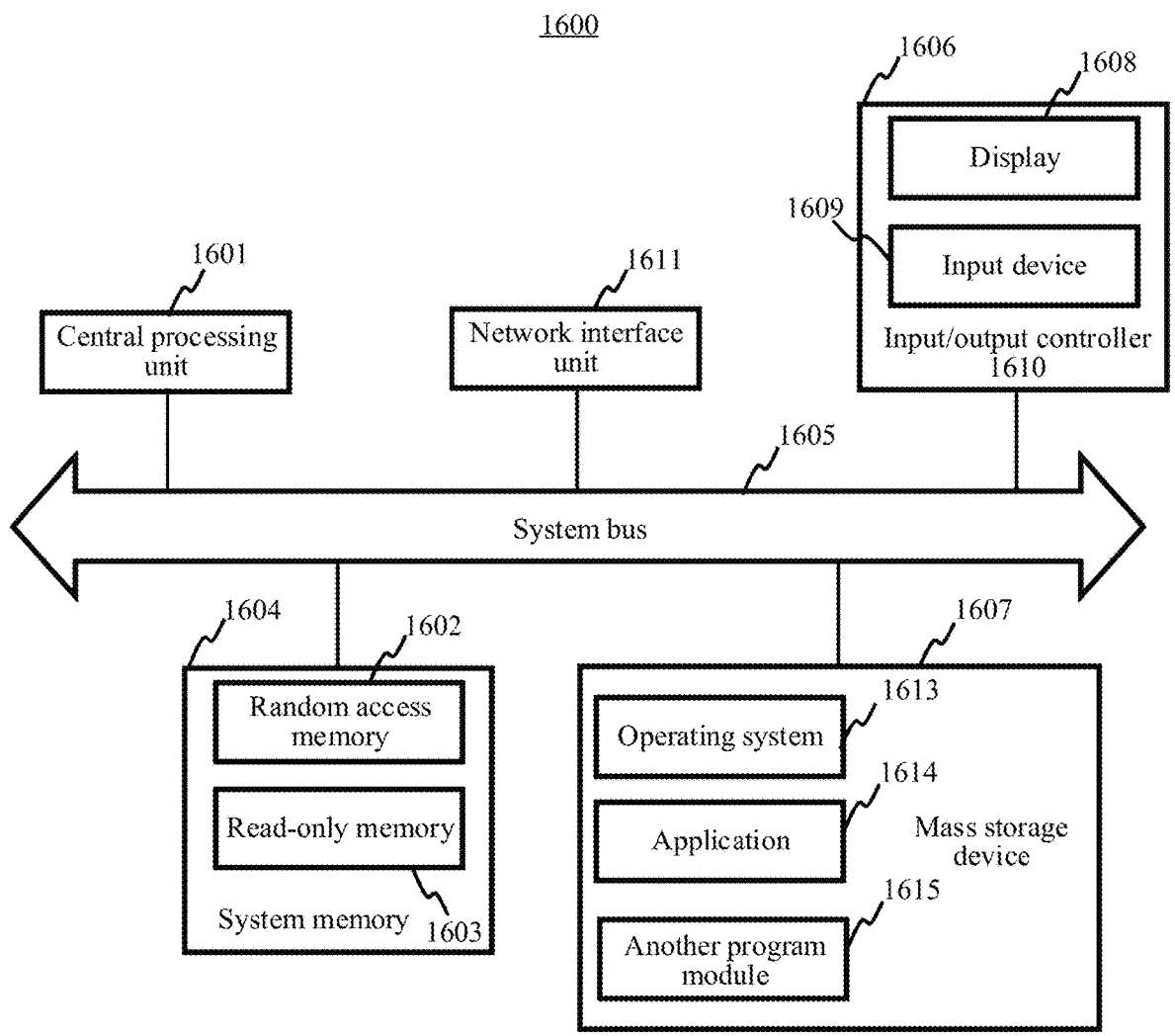
FIG. 16 is a schematic structural diagram of a computer device according to an exemplary embodiment.

FIG. 16 is a schematic structural diagram of a computer device according to an exemplary embodiment. The computer device 1600 includes a central processing unit (CPU) 1601, a system memory 1604 including a random access memory (RAM) 1602 and a read-only memory (ROM) 1603, and a system bus 1605 connecting the system memory 1604 and the CPU 1601. The computer device 1600 further includes a basic input/output (I/O) system 1606, configured to transmit information between components in the computer, and a mass storage device 1607 configured to store an operating system 1613, an application 1614, and another program module 1615.

The basic I/O system 1606 includes a display 1608 configured to display information and an input device 1609 such as a mouse or a keyboard that is used for inputting information by a user. The display 1608 and the input device 1609 are both connected to the CPU 1601 by an input/output (I/O) controller 1610 connected to the system bus 1605. The basic I/O system 1606 may further include the I/O controller 1610 for receiving and processing an input from a plurality of other devices such as a keyboard, a mouse, or an electronic stylus. Similarly, the I/O controller 1610 further provides an output to a display screen, a printer, or another type of output device.

The mass storage device 1607 is connected to the CPU 1601 by using a mass storage controller (not shown) connected to the system bus 1605. The mass storage device 1607 and an associated computer-readable medium provide non-volatile storage for the computer device 1600. That is, the mass storage device 1607 may include a computer-readable medium (not shown), such as a hard disk or a CD-ROM drive.

In general, the computer-readable medium may include a computer storage medium and a communications medium. The computer storage medium includes volatile and non-volatile, removable and non-removable media that store information such as computer-readable instructions, data structures, program modules, or other data and that are implemented by using any method or technology. The computer storage medium includes a RAM, a ROM, an EPROM, an EEPROM, a flash memory, or another solid state storage technology, a CD-ROM, a DVD, or another optical storage, a magnetic cassette, a magnetic tape, a magnetic disk storage, or another magnetic storage device. Certainly, it may be known by a person skilled in the art that the computer storage medium is not limited to the foregoing several types. The system memory 1604 and the mass storage device 1607 may be generally referred to as a memory.

The computer device 1600 may be connected to the Internet or another network device by using a network interface unit 1611 connected to the system bus 1605.

The memory further includes one or more programs. The one or more programs are stored in the memory. The CPU 1601 executes the one or more programs to implement the method for transmitting a scene image of a virtual scene shown in FIG. 5 and FIG. 6.

In an exemplary embodiment, a non-temporary computer-readable storage medium including an instruction, for example, a memory including a computer program (an instruction), is further provided, and the program (the instruction) may be executed by a processor in a computer device to complete the method for transmitting a scene image of a virtual scene in each embodiment of this application. For example, the non-temporary computer-readable storage medium may be a ROM, a RAM, a CD-ROM, a magnetic tape, a floppy disk, an optical data memory device or the like.

A person of ordinary skill in the art may understand that all or some of the processes of the methods in the foregoing embodiments may be implemented by a computer program instructing relevant hardware. The program may be stored in a non-volatile computer-readable storage medium. When the program is run, the processes of the foregoing method embodiments are performed. Any reference to the memory, storage, a database, or other media used in the embodiments provided in this application may include a non-volatile and/or volatile memory. The non-volatile memory may include a ROM, a programmable ROM (PROM), an electrically programmable ROM (EPROM), an electrically erasable programmable ROM (EEPROM), or a flash. The volatile memory may include a RAM or an external high-speed cache. As an illustration instead of a limitation, the RAM is available in various forms, such as a static RAM (SRAM), a dynamic RAM (DRAM), a synchronous DRAM (SDRAM), a double data rate SDRAM (DDRSDRAM), an enhanced SDRAM (ESDRAM), synchronous link (Synchlink) DRAM (SLDRAM), a rambus direct RANI (RDRAM), a direct rambus dynamic RAM (DRDRAM), and a rambus dynamic RAM (DRAM).

After considering the specification and implementing the present disclosure, persons skilled in the art can readily think of other implementations of this application. This application is intended to cover any variations, uses or adaptation of this application following the general principles of this application, and includes the well-known knowledge and conventional technical means in the art and undisclosed in this application. The specification and the embodiments are merely considered as examples, and the actual scope and the spirit of this application are pointed out by the following claims.

It is to be understood that this application is not limited to the accurate structures that are described in the foregoing and that are shown in the accompanying drawings, and modifications and changes may be made without departing from the scope of this application. The scope of this application is limited by the appended claims only.

What is claimed is:

1. A method for transmitting a scene image of a virtual scene, performed by a server, the method comprising:
rendering a first image to obtain a first rendered image, wherein the first image is obtained through acquisition of display data of a virtual scene when the display data changes;
acquiring a first time point at which the rendering of the first image is completed;
encoding the first rendered image to obtain an encoded image when an interval between the first time point and a second time point is not less than a first interval threshold, without waiting for an arrival of a next constant encoding cycle, wherein the second time point is a time point at which image encoding is performed last time; and
transmitting the encoded image to a terminal for decoding and displaying.

2. The method according to claim 1, further comprising:
estimating a third time point at which rendering of a second image to obtain a second rendered image is to be completed, wherein the second rendered image is a next frame of the first rendered image;
acquiring an interval between the third time point and the second time point when the interval between the first time point and the second time point is less than the first interval threshold; and
buffering the first rendered image when the interval between the third time point and the second time point is greater than a second interval threshold, wherein the second interval threshold is greater than the first interval threshold.

3. The method according to claim 2, wherein acquiring the third time point comprises:
acquiring time points at which rendering of each previous image of the first image is completed; and
acquiring the third time point according to both the first time point and rendering time intervals between every adjacent pair of previously rendered images.

4. The method according to claim 3, wherein acquiring the third time point according to both the first time point and the rendering time intervals between every adjacent pair of the previously rendered images comprises:
calculating the third time point denoted by $T_{n+1}$ using the following formula:

$$T_{n+1} = T_n + \sum_{i=1}^{n}\left(\frac{T_{n+1-i} - T_{n-i}}{2^i}\right),$$

$T_n$ being the first time point, $T_{n-i}$ being a time point at which the rendering of a previous $i^{th}$ frame of image before the first rendered image is finished.

5. The method according to claim 2, after buffering the first rendered image, the method further comprising:
encoding the first rendered image to obtain the encoded image when the rendering of the second image is not completed upon the arrival of a fourth time point, wherein the fourth time point is later than the second time point and an interval between the fourth time point and the second time point is an integer multiple of the second interval threshold.

6. The method according to claim 2, further comprising:
discarding the first rendered image without buffering when the interval between the third time point and the second time point is not greater than the second interval threshold.

7. The method according to claim 1, wherein the first interval threshold is determined according to a statistics feature of encoding and decoding capabilities of terminals supported by the server.

8. An apparatus for transmitting a scene image of a virtual scene, comprising a memory for storing computer instructions and a processor in communication with the memory, wherein, when the processor executes the instructions, the processor is configured to cause the apparatus to:
render a first image to obtain a first rendered image, wherein the first image is obtained through acquisition of display data of a virtual scene when the display data changes;
acquire a first time point at which the rendering of the first image is completed;
encode the first rendered image to obtain an encoded image when an interval between the first time point and a second time point is not less than a first interval threshold, without waiting for an arrival of a next constant encoding cycle, wherein the second time point is a time point at which image encoding is performed last time; and
transmit the encoded image to a terminal for decoding and displaying.

9. The apparatus according to claim 8, wherein, when the processor executes the instructions, the processor is configured to further cause the apparatus to:
estimate a third time point at which rendering of a second image to obtain a second rendered image is to be completed, wherein the second rendered image is a next frame of the first rendered image;
acquire an interval between the third time point and the second time point when the interval between the first time point and the second time point is less than the first interval threshold; and
buffer the first rendered image when the interval between the third time point and the second time point is greater than a second interval threshold, wherein the second interval threshold is greater than the first interval threshold.

10. The apparatus according to claim 9, wherein, when the processor is configured to cause the apparatus to acquire the third time point, the processor is configured to cause the apparatus to:
acquire time points at which rendering of each previous image of the first image is completed; and
acquire the third time point according to both the first time point and rendering time intervals between every adjacent pair of previously rendered images.

11. The apparatus according to claim 10, wherein, when the processor is configured to cause the apparatus to acquire the third time point according to both the first time point and the rendering time intervals between every adjacent pair of the previously rendered images, the processor is configured to cause the apparatus to:
calculate the third time point denoted by $T_{n+1}$ using the following formula:

$$T_{n+1} = T_n + \sum_{i=1}^{n}\left(\frac{T_{n+1-i} - T_{n-i}}{2^i}\right),$$

$T_n$ being the first time point, $T_{n-i}$ being a time point at which the rendering of a previous $i^{th}$ frame of image before the first rendered image is finished.

12. The apparatus according to claim 9, wherein, after the processor is configured to cause the apparatus to buffer the first rendered image, the processor is configured to further cause the apparatus to:
encode the first rendered image to obtain the encoded image when the rendering of the second image is not completed upon the arrival of a fourth time point, wherein the fourth time point is later than the second time point and an interval between the fourth time point and the second time point is an integer multiple of the second interval threshold.

13. The apparatus according to claim 9, wherein, when the processor executes the instructions, the processor is configured to further cause the apparatus to:
discard the first rendered image without buffering when the interval between the third time point and the second time point is not greater than the second interval threshold.

14. The apparatus according to claim 8, wherein the first interval threshold is determined according to a statistics feature of encoding and decoding capabilities of terminals supported by the apparatus.

15. A non-transitory storage medium for storing computer readable instructions, the computer readable instructions, when executed a processor, causing the processor to:
render a first image to obtain a first rendered image, wherein the first image is obtained through acquisition of display data of a virtual scene when the display data changes;
acquire a first time point at which the rendering of the first image is completed;
encode the first rendered image to obtain an encoded image when an interval between the first time point and a second time point is not less than a first interval threshold, without waiting for an arrival of a next constant encoding cycle, wherein the second time point is a time point at which image encoding is performed last time; and
transmit the encoded image to a terminal for decoding and displaying.

16. The non-transitory storage medium according to claim 15, wherein, the computer readable instructions further cause the processor to:
estimate a third time point at which rendering of a second image to obtain a second rendered image is to be completed, wherein the second rendered image is a next frame of the first rendered image;

acquire an interval between the third time point and the second time point when the interval between the first time point and the second time point is less than the first interval threshold; and buffer the first rendered image when the interval between the third time point and the second time point is greater than a second interval threshold, wherein the second interval threshold is greater than the first interval threshold.

17. The non-transitory storage medium according to claim 16, wherein, when the computer readable instructions cause the processor to acquire the third time point, the computer readable instructions cause the processor to:

acquire time points at which rendering of each previous image of the first image is completed; and acquire the third time point according to both the first time point and rendering time intervals between every adjacent pair of previously rendered images.

18. The non-transitory storage medium according to claim 17, wherein, when the computer readable instructions cause the processor to acquire the third time point according to both the first time point and the rendering time intervals between every adjacent pair of the previously rendered images, the computer readable instructions cause the processor to:

calculate the third time point denoted by $T_{n+1}$ using the following formula:

$$T_{n+1} = T_n + \sum_{i=1}^{n}\left(\frac{T_{n+1-i} - T_{n-i}}{2^i}\right),$$

$T_n$ being the first time point, $T_{n-i}$ being a time point at which the rendering of a previous $i^{th}$ frame of image before the first rendered image is finished.

19. The non-transitory storage medium according to claim 16, wherein, after the computer readable instructions cause the processor to buffer the first rendered image, the computer readable instructions further cause the processor to:

encode the first rendered image to obtain the encoded image when the rendering of the second image is not completed upon the arrival of a fourth time point, wherein the fourth time point is later than the second time point and an interval between the fourth time point and the second time point is an integer multiple of the second interval threshold.

20. The non-transitory storage medium according to claim 16, wherein, the computer readable instructions further cause the processor to:

discard the first rendered image without buffering when the interval between the third time point and the second time point is not greater than the second interval threshold.

* * * * *